United States Patent [19]

Yoshihara et al.

[11] Patent Number: 4,937,423
[45] Date of Patent: Jun. 26, 1990

[54] METHOD OF DISCONNECTING A SHORT-CIRCUITED PART BETWEEN MUTUALLY OPPOSED ELECTRODES

[75] Inventors: Satoshi Yoshihara; Yuichi Masaki, both of Kawasaki; Takashi Enomoto, Zama, all of Japan

[73] Assignee: Canon Kabushiki Kaisha, Tokyo, Japan

[21] Appl. No.: 231,469

[22] Filed: Aug. 12, 1988

[30] Foreign Application Priority Data

Aug. 17, 1987 [JP] Japan .................. 62-204426

[51] Int. Cl.$^5$ .................................. B23K 26/00
[52] U.S. Cl. ...................... 219/121.72; 219/121.85
[58] Field of Search ............ 219/121.68, 121.69, 219/121.67, 121.72, 121.6, 121.85

[56] References Cited

U.S. PATENT DOCUMENTS 4,240,094 12/1980 Mader .................. 219/121.69 X
4,259,367 3/1981 Dougherty, Jr. ......... 219/121.69 X
4,358,659 11/1982 Spohnheimer ........... 219/121.69 X Primary Examiner—C. L. Albritton
Attorney, Agent, or Firm—Fitzpatrick, Cella, Harper & Scinto

[57] ABSTRACT

A method of disconnecting a short-circuited part between upper and lower electrodes is provided which comprises the steps of;

(a) forming a cell by placing one upon another a first substrate provided with a common electrode and a second substrate provided with opposed electrodes in the manner that said common electrode and said opposed electrode may form a plurality of mutually opposed portions;

(b) detecting, among the plurality of mutually opposed portions, a mutually opposed portion at which a short circuit has occurred; and (c) disconnecting by insulation a short-circuited site present at the mutually opposed portion from the common electrode or opposed electrode.

20 Claims, 5 Drawing Sheets

METHOD OF DISCONNECTING A SHORT-CIRCUITED PART BETWEEN MUTUALLY OPPOSED ELECTRODES

BACKGROUND OF THE INVENTION

1. Field of the Invention

The present invention relates to a method of repairing a liquid crystal display panel, and more particularly to a method of repairing a ferroelectric liquid crystal display panel, that repairs a short circuit occurred between upper and lower electrodes owing to inclusion of a foreign matter in a cell.

2. Related Background Art

Since publication of twisted-nematic liquid crystals (TN liquid crystals) in "Applied Physics Letters", Vol. 18, No. 4, pp.127-128, by Shadt and W. Helfrich in 1971, liquid crystal display panels have made rapid progress, but recent trend in development of goods is shifting from original numerical display panels using segment electrodes to character display panels using a dot matrix. Particularly in recent years demanded is commercialization of liquid crystal display panels having a picture element of a large capacity and capable of answering for the display screens of word processors or personal computers and the display screens of televisions.

However, in multiplexing drive of the above TN liquid crystals, duty ratio decreases in the proportion of 1/N with increase in the number (N) of scanning lines, and hence there has been a limit in increasing the number of scanning lines. In the case of liquid crystal display panels of the type that picture elements formed at the sites at which scanning lines and data lines cross are controlled for each picture element, thin film transistors in the number corresponding to the number of picture elements are required to be formed on a liquid crystal display panel substrate, but a technically very difficult problem has been involved in forming this thin film transistors over a large area.

As a liquid crystal display panel that can solve these problems, proposed was the surface s&ability ferroelectric liquid crystal device published in "Applied Physics Letters", Vol. 36, No. 11, pp.899-901, by N. Clark and S.T Lagerwall in 1980. This ferroelectric liquid crystal device produces two stably aligned states by which a contrast can be discriminated according the direction of an electric field. This has made it necessary to see the cell thickness to be small enough to bring the spiral structure inherent in a chiral smectic liquid crystal to disappear, which thickness is exemplified by 0.5 $\mu$m to 2 $\mu$m in approximation.

For &his reason, there have been the problem that a short circuit may occur between upper and lower electrodes simply by inclusion of a minute foreign matter in the inside of a cell of the above ferroelectric liquid crystals. In particular, when the ferroelectric liquid crystal cell wired as the upper and lower electrodes with matrix electrodes (a scanning electrode and a signal electrode) for the multiplexing drive, any short-circuited part present at the site at which scanning lines and data lines cross may be identified by a vieWer as a line defect (non-switching line) having a shape of a cross formed by the scanning line and signal line at the short-circuited part, resulting in a loWering of display quality.

SUMMARY OF THE INVENTION

Accordingly, an object of the present invention is to provide a method of repairing a liquid crystal display panel that can solve the above problems, and to provide a liquid crystal display panel whose display quality has been thereby improved.

Another object of the present invention is to provide a process of preparing a liquid crystal display panel that can achieve an improved yield in the manufacture of liquid crystal display panels.

According to an aspect of the present invention, there is provided a method of disconnecting a short-circuited part between upper and lower electrodes, comprising the steps of;

(a) forming a cell by placing one upon another a first substrate provided with a common electrode and a second substrate provided with an opposed electrode in the manner that said common electrode and said opposed electrode may form a plurality of mutually opposed portions;

(b) detecting, among said plurality of mutually opposed portions, a portion at which a short circuit has occurred; and (c) disconnecting by insulation a short-circuited o site present at the mutually opposed portion from said common electrode or opposed electrode and a process of preparing a liquid crystal display panel by using the same.

BRIEF DESCRIPTION OF THE DRAWINGS

FIG. 5B is an electron microscope photograph showing a state of metal structure on a lower substrate after that.

DETAILED DESCRIPTION OF PREFERRED EMBODIMENTS

The present invention will be described below with reference to the accompanying drawings.

Figure 1A:
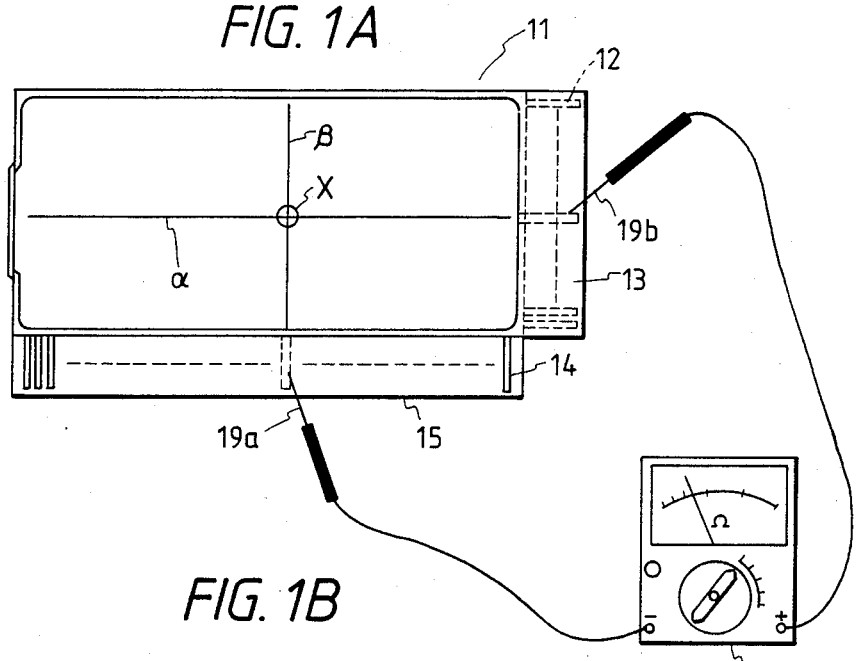
FIG. 1A is a plan view illustrating a display panel having been not repaired.
Figure 1B:
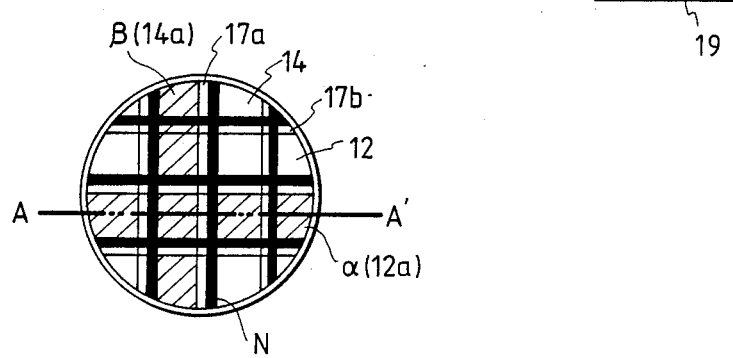
FIG. 1B is an enlarged plan view of a short-circuited site thereof.
Figure 1C:
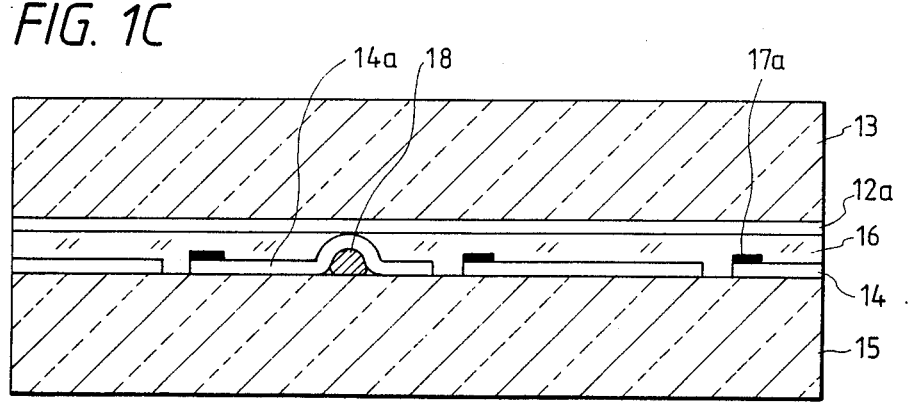
FIG. 1C is a cross section along the line A-A'.

FIG. 1A is a plan view illustrating a liquid crystal display panel 11, and FIG. 1B is an enlarged plan view of the part X in FIG. 1A. FIG. 1C is a cross section along the line A-A' in FIG. 1B.

The liquid crystal display panel 11 illustrated in FIG. 1 is provided with ferroelectric liquid crystal 16 between an upper substrate 13 provided with a transparent common electrode (a terminal) 12 (that functions, for example, as a scanning electrode at the time of multiplexing drive) and a lower substrate 15 provided with transparent opposed electrodes (a terminal) 14 (that functions, for example, as a signal electrode at the time of multiplexing drive). In the liquid crystal display panel 11 illustrated in FIG. i, a non switching scanning line $\alpha$ and a non-switching signal line $\beta$ is identified in a display screen by a viewer. Line N in FIG. 1B corresponds to a line on which no mutually opposed electrodes are formed. The position of a polarization axis of a polarizer and an analyzer is so set that the liquid crystal alignment on the line N may be in the dark state when the liquid crystal is placed between the polarizer and the analyzer. The transparent common electrode 12 and the transparent opposed electrodes 14 are provided with electrically connected low-resistance lines 17b and 17a, respectively. This low-resistance lines 17b and 17a can be formed using metals such as silver, copper, gold, aluminum, chromium and molybdenum or alloys of any of these and may have a film thickness in the range of from 500 angstroms to 5,000 angstroms, preferably from 1,000 angstroms to 3,000 angstroms. The line width thereof may preferably be set in the range of from 10 $\mu$m to 50 $\mu$m.

The defective line $\alpha$–$\beta$ mentioned above which appeared in the display screen, is a site corresponding to a crossing part of the defective line $\alpha$–$\beta$ and caused by a short circuit occurred between a transparent common electrode 12a and a transparent signal electrode 14a as illustrated in FIG. 1C. AT this short-circuited site, a foreign matter 18 as exemplified by dust and resin is included between the lower substrate 15 and transparent opposed electrode 14a, thus producing a convex on the transparent opposed electrode 14a, which causes a short circuit in contact with the transparent common electrode 12a. Besides the above state, the causes of the short circuit may also include a state in which a conductive particle is held between the transparent common electrode 12 and transparent opposed electrode 14.

Such a short-circuited part can be detected by actuating terminals 19a and 19b of a circuit tester 19.

Figure 2:
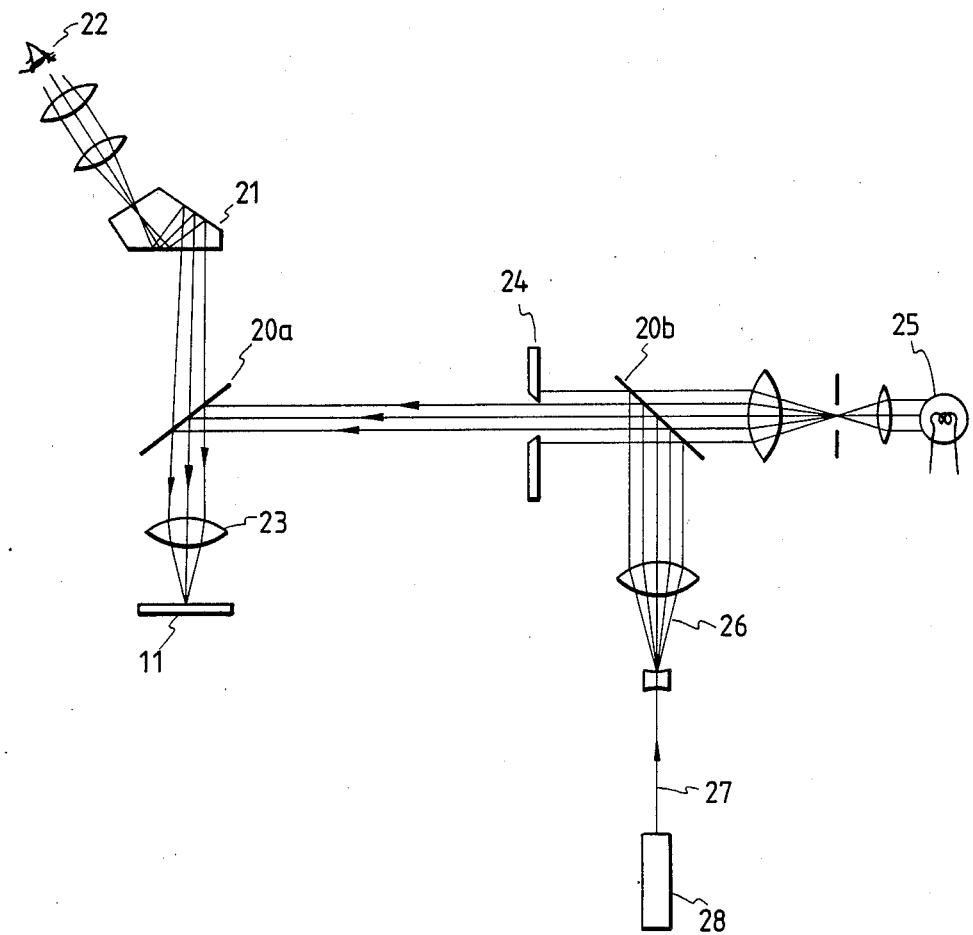
FIG. 2 is a block diagram of a repair apparatus used in the method of the present invention.

FIG. 2 is a block diagram illustrating a repair apparatus used in the method of the present invention. In the figure the numeral 21 denotes a microscope; 22, a viewer; 23, an objective lens; 24, a slit; 25, a pilot light source: 26, a beam expander; 27, a laser beam; and 28, a laser beam generator.

In the repair apparatus illustrated in FIG. 2, &he short-circuited si&e existing in the ferroelectric liquid crystal display panel 11 is detected by the microscope 21, and thereafter the positioning of the site to which the laser beam is irradiated and the spot-setting of the laser beam 27 can be carried out by irradiating light from the pilot light source 28. On the light path from the pilot light source 25 to the ferroelectric liquid crystal display panel 11, provided are half mirrors 20a and 20b, and a slit 24 that controls the X-axis and Y-axis of the laser-beam irradiated part 31 and narrows the beam width.

Figure 3A:
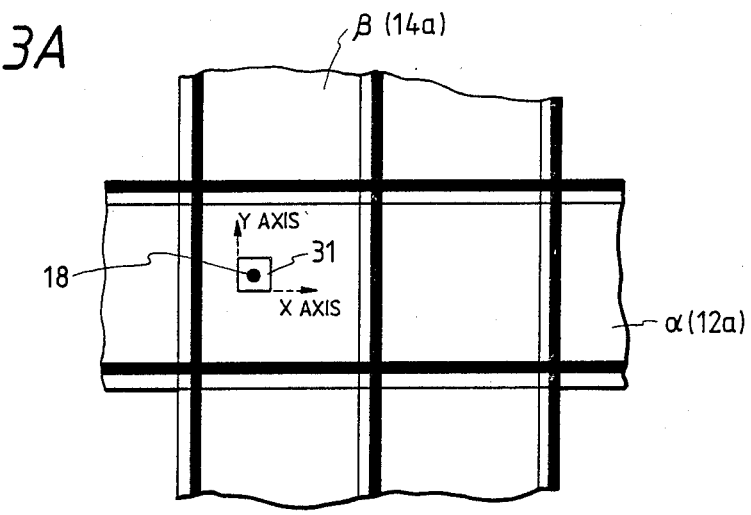
FIG. 3A is a plan view illustrating the method of the present invention.
Figure 3B:
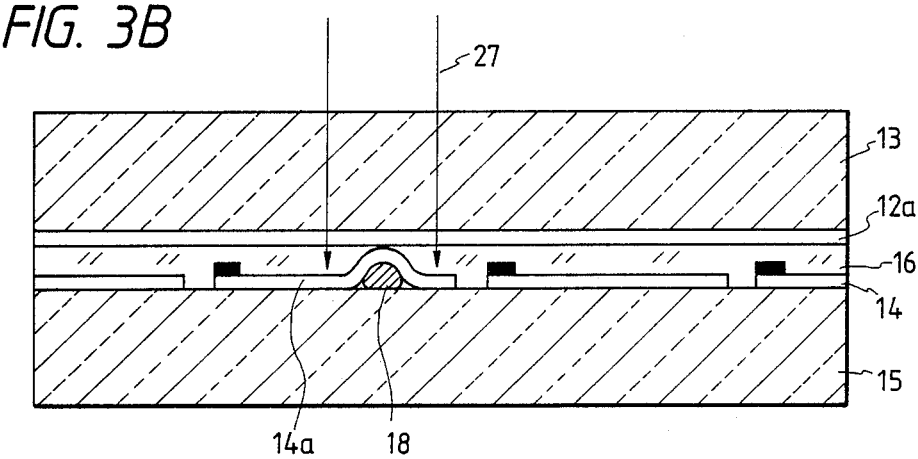
FIG. 3B is a cross section thereof.
Figure 4A:
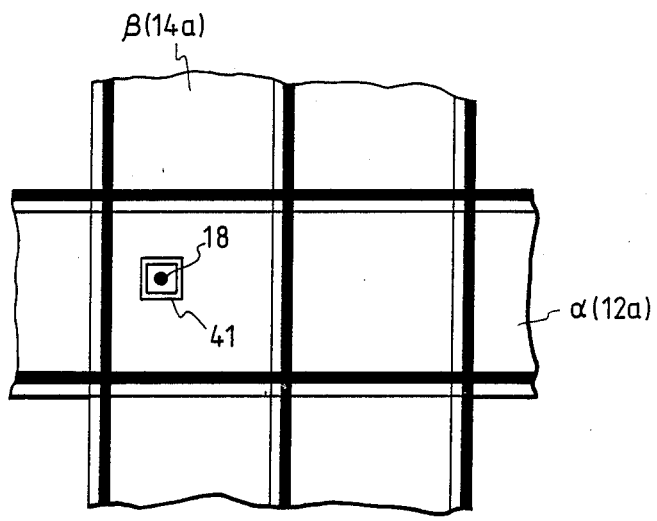
FIG. 4A is a plan view illustrating a display panel having been repaired according to the present invention.
Figure 4B:
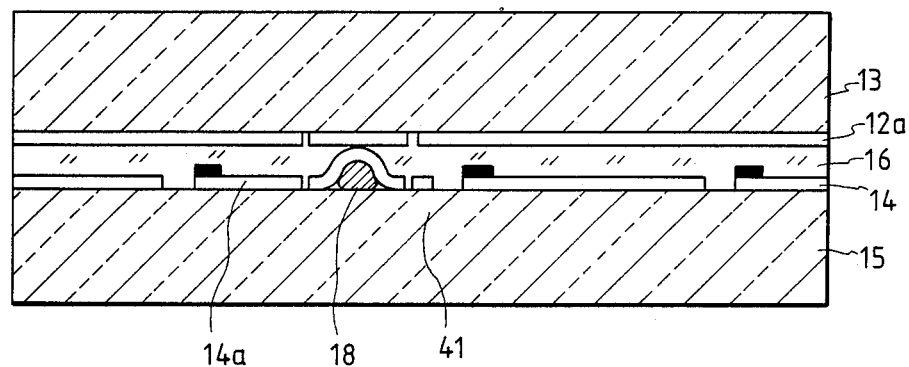
FIG. 4B is a cross section thereof.

Next, the laser beam 27 from the laser beam generator 28 is, after being expanded in its width through the beam expander 26, reflected by half mirrors 20b and 20a, and irradiated on the ferroelectric liquid crystal display panel. Thus, in the present invention, irradiating the laser beam 27 as illustrated in FIG. 3 (a laser beam irradiating part 31) enables formation of an insulation disconnected part 41 at which the short-circuited site is disconnected from the transparent common electrode 12a and transparent opposed electrode 14a as illustrated in FIG. 4.

In the present invention, used as the laser beam 27 are a YAG laser beam, a ruby laser beam and a $CO_2$ laser beam, and the YAG laser (oscillation wavelength: 1.06 $\mu$m) may preferably be used in instances in which the transparent&electrodes 12 and 14 are formed with ITO (indium tin-oxide) and also the low resistance lines 17a and 17b are formed with molybdenum. The beam spot of this laser beam 27 can be arbitrarily set, but may generally range from 1 $\mu$m to 100 $\mu$m, preferably from 1 $\mu$m to 10 $\mu$m in approximation. Laser power may be from 0.1 mJ/pulse to 10 mJ/pulse in approximation, and its pulse width may be from 1 to 100 nsec in approximation. In this occasion the insulation- disconnected part 41 is required to be formed so that the transparent common electrode 12 and &he transparent opposed electrode 14 may not undergo any insulation disconnection from their respective terminals.

A step of forming the above insulation-disconnected part 41 can be introduced after a step of placing one upon another the upper substrate 13 provided with the transparent common electrode 12 and the lower substrate 15 provided With the transparent opposed electrode 14 to form an empty cell, and before a step anterior to a step of filling said empty cell with liquid crystals. The step of forming the insulation disconnected part 41 can also be introduced in a step posterior to the step of filling the empty cell with liquid crystals. Here, in instances in which the liquid crystals in the cell comprises ferroelectric liquid crystals, the liquid crystals are locally heated at the part onto which the laser beam 27 is irradiated, causing alignment disturbance at this part, so that there may preferably be employed a re-alignment step. More specifically, the re-alignment of liquid crystals 16 can be achieved by heating, after irradiation of the laser beam 27, the liquid crystals 16 filled in the ferroelectric liquid crystal display panel 11 until they come to an isotropic phase and thereafter cooling it gradually at the rate of about 5° C/h.

The upper substrate 13 and/or lower substrate 15 used in the present invention may preferably be provided with an alignment& control film which has been subjected to monoaxial alignment treatment. The monoaxial alignment treatment can be conducted by rubbing, oblique evaporation or oblique etching. Usable as the alignment control film are, for example, organic alignment control films made of polyimide, polyamide, polyamidoimide, polyester, polyester imide, polyvinyl alcohol, polyethylen, etc. or inorganic alignment control films made of SiO, $SiO_2$, $TiO_2$, etc. disclosed in U.S. Pat. Nos. 4,561,726 and No. 4,639,089.

Experiments made by the present inventors also revealed that, even after the local heating by the laser beam 27, the function of alignment control is little adversely affected when polyimide, polyamidoimide, polyester imide, polyamide, polyvinyl alcohol or $SiO_2$ is sued as the alignment control film.

In a preferred embodiment of the present invention, a highly dielectric insulating film formed with $SiO_2$, $TiO_2$ or $Ta_2O_5$ can be provided between the common electrode and alignment control film and between the opposed electrode and alignment control film. This insulating film is formed to have a film thickness of generally from 1OO angstroms to 5,000 angstroms, preferably from 300 angstroms to 2,000 angstroms. Here, if a conductive foreign matter is included between the common electrode substrate and opposed electrode substrate, this conductive foreign matter may break through the insulating film formed on the electrode to cause a short circuit between the common electrode and opposed electrode. Accordingly, the repairing method previously described may be used to eliminate the appearance of the defective line $\alpha$–$\beta$ as illustrated in FIG. 1A.

In the present invention, usable as the above ferroelectric liquid crystals 16 are, for example, those disclosed in U.S. Pat. No. 4,561,726, No. 4,589,996. No. 4,592,858, No. 4,596,667, No. 4,613,209, No. 4,614,609, No. 4,615,586, No. 4,622,165, No. 4,639,089, etc.

In the present invention, it is also possible to provide a spacer member for making control to keep constant the space between the upper substrate 13 and lower substrate 15. Usable as this spacer member are plastic beads, glass beads or the like having an average particle diameter of from 0.5 $\mu$m to 5 $\mu$m. Here, usable as the plastic beads are adhesive resin beads enabling adhesion between the upper substrate 13 and lower substrate 15. There can be also used mixed beads comprising this adhesive resin beads and the glass beads.

The present invention will be described below by giving Examples.

EXAMPLE 1

On glass substrates, stripe-shaped electrodes o respectively comprising indium oxide and molybdenum were formed in the manner as shown in the following table.

|  | Number | Indium oxide (Transparent electrode) | | Molybdenum (Low-resistance line) | | Space between electrodes |
|---|---|---|---|---|---|---|
|  |  | Electrode width | Film thickness | Electrode width | Film thickness |  |
| Upper electrode | 400 lines |  |  |  |  |  |
| Lower electrode | 640 lines | 280 $\mu$m | 1,000 Å | 20 $\mu$m | 2,000 Å | 20 $\mu$m |

Next, a polyimide polymeric film (using SP-710; trade name; available from Toray Industries, Inc.) was provided on the electrode substrates, and rubbing alignment treatment was carried out in one direction by using cloth. On one of &he substrates, an isopropyl alcohol solution containing 0.05% by weight of $SiO_2$ beads having an average particle diameter of 1.5 microns was further spin coated, followed by heat drying and thereafter placing the upper substrate on the lower substrates with the interposition of a seal material comprising an epoxy adhesive, and then heating under contact bonding to form a panel (empty cell) having a gap of about 1.5 microns. In the panel thus obtained, ferroelectric liquid crystals (CS-1014: available from Chisso Corporation) were enclosed to prepare a display device. Subsequently application of display signals between the upper and lower electrodes resulted in appearance of a part that showed a display in a state different from other electrode portions, in the shape of a cross as illustrated in FIG. 1A, and measuring the resistance value between the upper and lower electrodes corresponding to that part by use of a circuit tester revealed that there was shown about 30 K.ohms and was seen a short-circuited state. Observation of the corresponding picture image with use of a microscope (magnification: 50) shows a foreign matter of about 10 $\mu$m in diameter in the picture element.

This display device was set in a YAG laser beam repair apparatus (SL456B; available from NEC) illustrated in FIG. 2, and the electrode was cut on the periphery of the foreign matter by the laser beam, under the following conditions and in the state that the display device stands as it is.

Wavelength: 1.06 $\mu$m

Power: 2 mJ/pulse

Beam: 5 $\mu$m=10 $\mu$m

Pulse width: 20 nsec

The resulting states are shown in FIG. 5. Measuring again the resistance value between the same electrodes with use of a tester reveled that the value was 20 M.ohms or more, which was equal to the resistance value shown in normal electrodes. This display device was further subjected to heating for 2 hours at a temperature of 90° C and gradual cooling for 8 hours to a temperature of 40° C, followed by application of display signals between the upper and lower electrodes. As a result, there was seen no line defect in the shape of a cross illustrated in FIG. 1A, and, also in the picture element remedied by the laser repair, there was shown switching characteristics in the state that liquid crystals were aligned without any problem in image quality to the naked eye, thus bringing about remarkable improvement in the display quality.

Figure 5A:
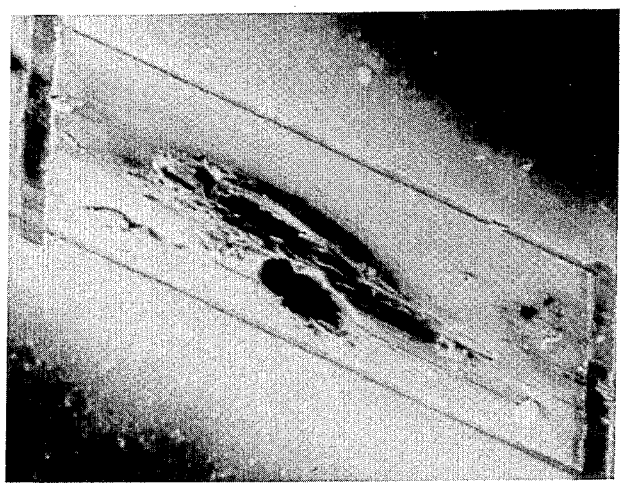
FIG. 5A is an electron microscope photograph showing a state of metal structure on an upper substrate after repairment.
Figure 5B:

FIG. 5A shows a state of the upper substrate after the upper substrate and lower substrate of the empty cell were peeled off, and FIG. 5B shows a state of the lower substrate thus peeled, each of which is a microscope photograph of 1,000 magnification.

EXAMPLE 2

Example 1 was exactly repeated to carry out an experiment, except that the step of insulation disconnection treatment on the short circuited site with use of the YAG laser beam repair apparatus used in Example 1 was carried out in a step before the empty cell was filled with ferroelectric liquids. As a result, there were obtained the same results as in Example 1.

EXAMPLE 3

Example 1 was exactly repeated &o carry out an experiment, except that the polyimide film used when the cell of Example 1 was prepared was replaced by a polyvinyl alcohol film. As a result, there were obtained the same results as in Example 1.

EXAMPLE 4

Example 1 was exactly repeated to carry out an experiment, except that an $SiO_2$ film of 500 angstrom thick was previously formed before the polyimide film was formed on the glass substrate used when the cell of Example 1 was prepared As a result, there were obtained the same results as in Example 1.

EXAMPLE 5

Example 4 was exactly repeated to carry out an experiment, except that a $Ta_2O_5$ film Was used in place of the $SiO_2$ film used in Example 4. As a result, there were obtained the same results as in Example 4.

EXAMPLE 6

Example 4 was exactly repeated to carry out an experiment, except that a $TiO_2$ film was used in place of the $SiO_2$ film used in Example 4. As a result there were obtained the same results as in Example 4.

We claim:

1. A method of disconnecting a short-circuited part comprising: the steps of:
   providing a first substrate comprising a plurality of upper side electrodes and a second substrate comprising a plurality of lower side electrode, wherein said first and second substrates each have alignment control films subjected to a monoaxial alignment treatment;

orienting said first and second substrates to provide a gap therein between such that said upper and lower electrodes form a plurality of mutually opposed portions;

detecting whether or not a short-circuit has occurred among said plurality of mutually opposed portions; and disconnecting the short-circuited site present at the mutually opposed portion from at least one of said upper side of said lower side electrodes.

2. The method of disconnecting a short-circuited part according to claim 1, wherein said disconnecting step comprises irradiating a laser beam.

3. The method of disconnecting a short-circuited part according to claim 2, wherein said laser beam is a YAG, a ruby or a $CO_2$ laser beam.

4. The method of disconnecting a short-circuited part according to claim 1, wherein said short-circuited site is disconnected by insulation from the upper side electrode and the lower side electrode.

5. The method of disconnecting a short-circuited part according to claim 1, wherein said disconnecting step comprises insulating the short-circuited site present at the mutually opposed portion from said upper side electrode and lower side electrode, such that the electrical integrity of the upper and lower side electrodes from which the short-circuited site is disconnected is maintained after such disconnection.

6. The method of disconnecting a short-circuited part according to claim 1, wherein the plurality of said upper side electrodes function either as scanning or signal electrodes and the plurality of said lower side electrodes function as the other.

7. The method of disconnecting a short-circuited part according to claim 1 wherein said alignment control film is formed from at least one material selected from the group consisting of polyimide, polyamidoimide, polyester imide, polyamide, polyvinyl alcohol and $SiO_2$.

8. The method of disconnecting a short-circuit part according to claim 7, wherein an insulating film is provided between said alignment control film and said upper side electrodes, and between said alignment control film and said lower side electrodes.

9. The method of disconnecting a short-circuited part according to claim 8, wherein said insulating film comprises $SiO_2$, $TiO_2$ or $Ta_2O_5$.

10. The method of disconnecting a short-circuited part according to claim 1, wherein said monoaxial alignment treating is a rubbing treatment.

11. The method of disconnecting a short-circuited part according to claim 1, wherein said monoaxial alignment treatment is an oblique evaporation treatment.

12. The method of disconnecting a short-circuited part according to claim 7, wherein said disconnecting step comprises irradiating a laser beam.

13. The method of disconnecting a short-circuited part according to claim 12, wherein said laser beam is a YAG, ruby or $CO_2$ laser beam.

14. The method of disconnecting a short-circuited part according to claim 7, wherein said short-circuited site is disconnected by insulating the upper side electrode from both the upper and the lower side electrodes.

15. The method of disconnecting a short-circuited part according to claim 7, wherein said disconnecting step comprises insulating the short-circuited site present at the mutually opposed portion from the upper side electrode and the lower side electrode, such that the integrity of the upper and lower side electrodes from which the short-circuited site is disconnected is maintained after such disconnection.

16. The method of disconnecting a short-circuited part according to claim 7, wherein a plurality of the upper side electrodes function as scanning electrodes, and a plurality of the lower side electrodes function as signal electrodes.

17. The method of disconnecting a short-circuited part according to claim 7, wherein an insulating film is provided between said alignment control film and the upper side electrode, and between said alignment control film and the lower side electrodes.

18. The method of disconnecting a short-circuited part according to claim 17, wherein said insulating film comprises $SiO_2$, $TiO_2$ or $Ta_2O_5$.

19. The method of disconnecting a short-circuited part according to claim 7, wherein the monoaxial alignment treating is a rubbing treatment.

20. The method of disconnecting a short-circuited part according to claim 7, wherein the monoaxial alignment treatment is an oblique evaporation treatment.

* * * * *

UNITED STATES PATENT AND TRADEMARK OFFICE
CERTIFICATE OF CORRECTION

PATENT NO. : 4,937,423

DATED : June 26, 1990

INVENTOR(S) : SATOSHI YOSHIHARA ET AL.

It is certified that error appears in the above-identified patent and that said Letters Patent is hereby corrected as shown below:

ON THE TITLE PAGE,

AT [57] ABSTRACT

Line 3, "of;" should read --of:--.
    Line 6, "electrodes" should read --electrode--.

COLUMN 1

Line 23, "demanded is" should read --demand is the--.
    Line 43, "s&ability" should read --stability--.
    Line 49, "see" should read --set--.
    Line 54, "&his" should read --this--.
    Line 64, "vieWer" should read --viewer--.
    Line 67, "loWering" should read --lowering--.

COLUMN 2

Line 5, "panel" should read --panel,--.
    Line 27, "electrode" (second occurrence) should read --electrode;--.
    Line 67, "FIG. i," should read --FIG. 1,--.

COLUMN 3

Line 23, "AT" should read --at--.
    Line 37, "figure" should read --figure,--.
    Line 41, "&he" should read --the--.
    Line 42, "si&e" should read --site--.
    Line 47, "source 28." should read --source 25.--.
    Line 68, "transparent & electrodes" should read --transparent electrodes--.

UNITED STATES PATENT AND TRADEMARK OFFICE
CERTIFICATE OF CORRECTION

PATENT NO. : 4,937,423

DATED : June 26, 1990

INVENTOR(S) : SATOSHI YOSHIHARA ET AL.

It is certified that error appears in the above-identified patent and that said Letters Patent is hereby corrected as shown below:

COLUMN 4

Line 10, "&he" should read --the--.
Line 17, "With" should read --with--.
Line 36, "alignment&" should read --alignment--.
Line 43, "polyethylen," should read --polyethylene,--.
Line 51, "sued" should read --used--.
Line 58, "1OO" should read --100--.

COLUMN 5

Line 5, "No. 4,622,I65," should read --No. 4,622,165,--.
Line 20, "o" should be deleted.
Line 36, "lndustries, lnc.)" should read --Industries, Inc.)--.
Line 39, "&he" should read --the--.

COLUMN 6

Line 6, "reveled" should read --revealed--.
Line 48, "prepared" should read --prepared.--.
Line 53, "Was" should read --was--.
Line 60, "result" should read --result,--.
Line 64, "comprising:" should read --comprising--.
Line 67, "electrode" should read --electrodes--.

COLUMN 7

Line 12, "of" should read --or--.
Line 38, "claim 1" should read --claim 1,--.

UNITED STATES PATENT AND TRADEMARK OFFICE
CERTIFICATE OF CORRECTION

PATENT NO. : 4,937,423

DATED : June 26, 1990

INVENTOR(S) : SATOSHI YOSHIHARA ET AL.

It is certified that error appears in the above-identified patent and that said Letters Patent is hereby corrected as shown below:

COLUMN 8

Line 6, "treating" should read --treatment--.
Line 37, "electrode," should read --electrodes,--.
Line 44, "treating" should read --treatment--.

Signed and Sealed this

Seventh Day of April, 1992

*Attest:*

HARRY F. MANBECK, JR.

*Attesting Officer*  *Commissioner of Patents and Trademarks*